United States Patent [19]
Gatter et al.

[11] Patent Number: 5,215,327
[45] Date of Patent: Jun. 1, 1993

[54] VEHICLE SUSPENSION

[75] Inventors: Klaus Gatter, Winnenden; Gerhard Keuper, Leonberg; Michael Panther, Markgroenningen, all of Fed. Rep. of Germany

[73] Assignee: Robert Bosch GmbH, Stuttgart, Fed. Rep. of Germany

[21] Appl. No.: 678,421

[22] Filed: Apr. 1, 1991

[30] Foreign Application Priority Data

May 7, 1990 [DE] Fed. Rep. of Germany ....... 4014466

[51] Int. Cl.$^5$ ...................... B60G 13/00; B60G 11/26
[52] U.S. Cl. .................................. 280/662; 280/670; 280/672; 280/701; 280/708; 267/225; 267/226
[58] Field of Search ............... 280/707, 660, 662, 670, 280/672, 690, 701, 708; 267/221, 225, 226

[56] References Cited

U.S. PATENT DOCUMENTS

| | | | |
|---|---|---|---|
| 1,653,361 | 12/1927 | Krammer | 267/225 X |
| 3,124,368 | 3/1964 | Corley et al. | 280/672 X |
| 3,482,855 | 12/1969 | Capgrass | 280/708 |
| 3,736,000 | 5/1973 | Capgras | 280/708 |
| 4,655,440 | 4/1987 | Eckert | 280/707 X |
| 4,702,490 | 10/1987 | Yamagochi et al. | 280/707 |
| 4,779,895 | 10/1988 | Rubel | 280/707 |
| 4,825,370 | 4/1989 | Kurosawa | 280/707 X |
| 4,913,457 | 4/1990 | Hafner et al. | 280/707 |
| 4,921,272 | 5/1990 | Ivers | 280/707 |
| 4,966,390 | 10/1990 | Lund et al. | 280/707 X |
| 4,973,077 | 11/1990 | Kuwayama et al. | 280/707 X |
| 4,976,454 | 12/1990 | Bohn | 280/707 |
| 5,024,302 | 6/1991 | Karnoff | 280/707 X |
| 5,082,308 | 1/1992 | Jones | 280/707 |
| 5,110,152 | 5/1992 | Jones | 280/707 |

FOREIGN PATENT DOCUMENTS

| | | | |
|---|---|---|---|
| 28709 | 2/1988 | Japan | 280/707 |
| 1243964 | 7/1986 | U.S.S.R. | 280/708 |

Primary Examiner—Robert P. Olszewski
Assistant Examiner—Boris Milef
Attorney, Agent, or Firm—Edwin E. Greigg; Ronald E. Greigg

[57] ABSTRACT

The stiffness of the suspension is very much a function of the load in hydro-pneumatic vehicle suspensions. With high loads the vehicle suspension is stiff and with a light load it is relatively soft. In addition, the vehicle suspension of the wheel on the outside of the turn is stiffer than that of the wheel at the inside of the turn. The changes in the stiffness of the vehicle suspension are very disagreeable and can result in dangerous driving conditions. Equalization of the stiffness of the vehicle suspension is provided with the aid of a supplemental force. The supplemental force acts in the same direction as the load force of the vehicle chassis. The vehicle suspension is preferably suited for motor vehicles.

15 Claims, 8 Drawing Sheets

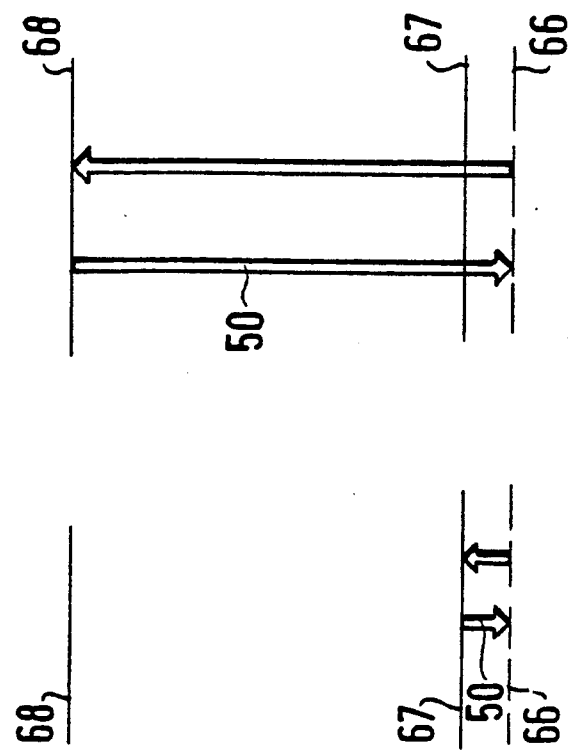

VEHICLE SUSPENSION

BACKGROUND OF THE INVENTION

The invention relates to a vehicle suspension as defined hereinafter.

OBJECT AND SUMMARY OF THE INVENTION

A vehicle suspension is already known in which a shock-absorbing strut is installed which is located between the mass of the vehicle and the mass of the wheel.

In addition to the shock-absorbing strut, the known vehicle suspension comprises a pressure source, a pressure control device and a hydro-pneumatic reservoir. A required pressure is made available in the inlet of the pressure control device with the aid of the pressure source. A line leads from the pressure control device to a work chamber of the shock-absorbing strut. The reservoir is also connected with the work chamber of the shock-absorbing strut. The pressure in the work chamber can be adjusted by means of the pressure control device in accordance with actual requirements or as desired. The reservoir functions as a spring and is used to receive the pressure media or to release pressure media when the shock-absorbing strut is compressed or relaxed.

When the mass of the vehicle exerts a large load force on the shock-absorbing strut, pressure in the work chamber of the shock-absorbing strut is increased via the pressure control device, and when the load force on the shock-absorbing strut is small, the pressure in the work chamber is reduced. The load force contains static and dynamic force components. With vehicles having a light vehicle chassis but greatly varying loads, the load force on the shock-absorbing strut can vary greatly. A particularly great variation of the load force is the result of cornering. In this case it is possible, for example, that a very large load force act on the shock-absorbing strut on the outside of the turn and a very small load force may act, for example, on the shock-absorbing strut on the inside of the turn. In an extreme case it is possible that the load force on the shock-absorbing strut on the inside of the turn is reduced to zero.

Because of the great variations in the load force on the respective shock-absorbing strut, the pressure in the work chamber and in the reservoir also changes in a corresponding way. Based on the compressibility of the gas in the reservoir, which is variable with pressure, the stiffness of the spring is great when there is high pressure in the work chamber or in the reservoir, and with low pressure the stiffness of the spring is small. This means that the suspension of the vehicle is very stiff under a great load or at the shock-absorbing strut on the outside of the turn and the suspension is very soft with decreased load or at the shock-absorbing strut on the inside of the turn. This constitutes a very unpleasant effect in the known vehicle suspension. It would be considerably more advantageous if the stiffness of the vehicle suspension were independent to a large degree from the load force, i.e. from the loading conditions and vehicle movements such as cornering, acceleration or braking.

In contrast to the foregoing, the vehicle suspension equipped with the features set forth hereinafter has an advantage that the stiffness of the vehicle suspension is independent to a large degree from the load force.

The adjustment of the stiffness of the vehicle suspension between maximum load force and minimum load force can be advantageously freely selected by selecting the supplementary force. This means that by means of the supplementary force there is a capability to influence the stiffness of the vehicle suspension, which is a result of a change in the load force.

By the generation of the supplementary force by means of pressure in a second work chamber of the shock-absorbing strut and/or the provision of a spring element between the masses which are to be cushioned, it is advantageously possible to provide the supplementary force in a very simple manner and to obtain a simply constructed shock-absorbing strut at the same time.

The shock-absorbing strut can also assume advantageously and in a simple manner the function of a damper by the provision of a throttle between the work chamber of the shock-absorbing strut and the reservoir connected to it or between the second work chamber and the reservoir connected thereto.

By connecting the second work chamber of the shock-absorbing strut with a pressure source or with a reservoir, the required pressure in the second work chamber can be very advantageously provided.

A particularly simple construction results in an advantageous manner if the shock-absorbing strut comprises a cylinder with a piston rod and with a piston which divides the cylinder into two chambers, where the one chamber is used as a work chamber and the other chamber is used as a second work chamber for generating the supplementary force.

A particularly advantageous, simple construction results from the disposition of the spring element for generating the supplementary force inside the cylinder of the shock-absorbing strut. In this way it is possible in a particularly simple manner to protect the spring element from the effects of the environment.

If the supplementary force is generated solely by the spring element, this has an advantage that no additional seal is required in connection with the vehicle suspension in accordance with the invention which, among others, has the advantage that no increased friction occurs in the embodiment according to the invention compared with the known vehicle suspension.

The invention will be better understood and further objects and advantages thereof will become more apparent from the ensuing detailed description of four preferred embodiments taken in conjunction with the drawings.

BRIEF DESCRIPTION OF THE DRAWINGS

FIGS. 4a and 4b show the forces occurring in the known vehicle suspension,

FIGS. 5a and 5b show the forces occurring in the vehicle suspension of the invention, and FIGS. 6 to 9 each show an exemplary embodiment of the vehicle suspension of the invention.

DESCRIPTION OF THE PREFERRED EMBODIMENTS

Figure 1:
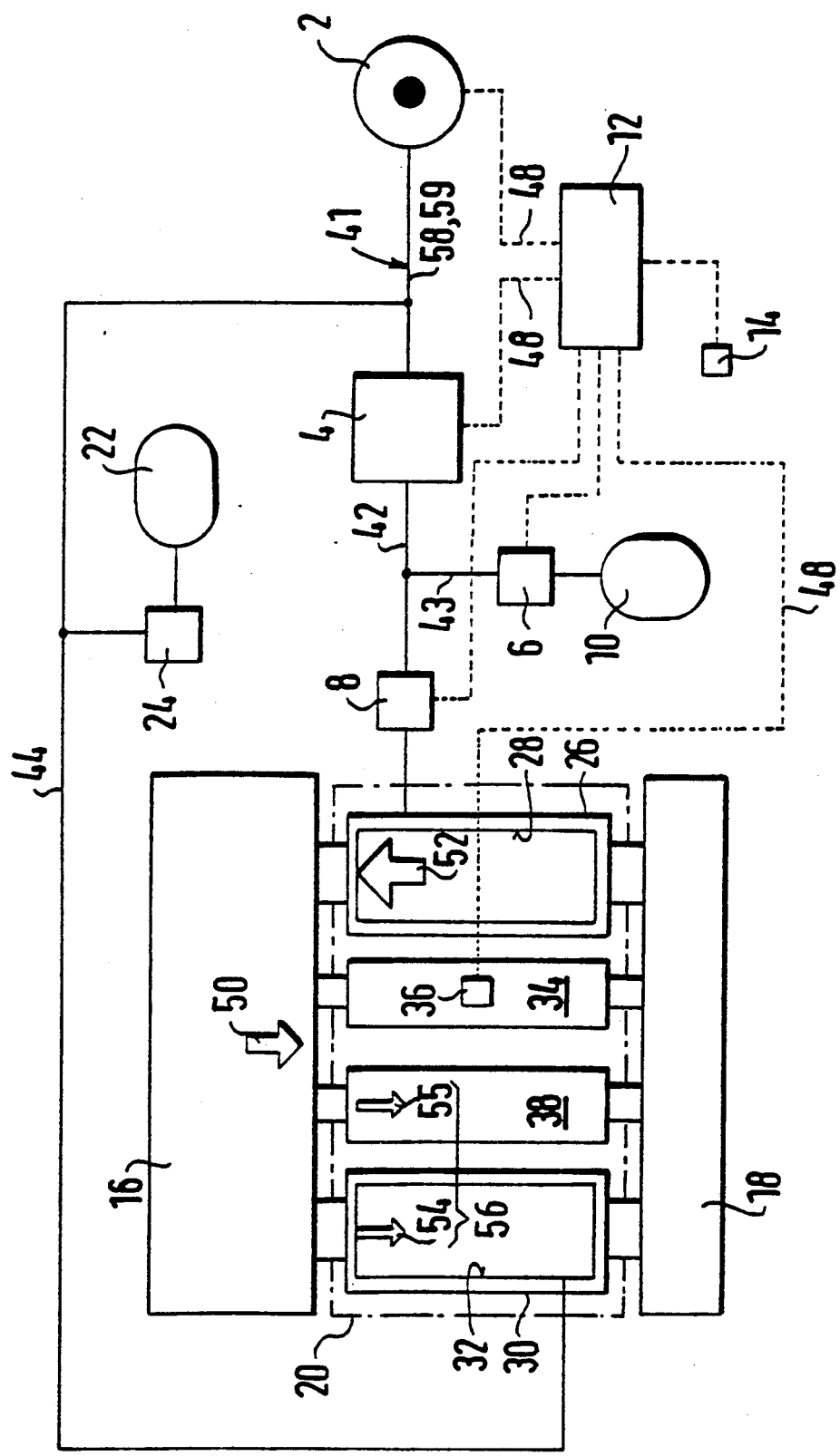
FIGS. 1 to 3 each show an illustration of the system of the invention.

FIG. 1 shows the vehicle suspension of the invention in a first system illustration. Essentially, it shows the following symbolically indicated details: a pressure source 2, a pressure control device 4, a flow control valve 6, a flow control valve 8, a reservoir 10, a control device 12, a sensor 14, a first mass 16, a second mass 18, a shock-absorbing strut 20, a reservoir 22 and a flow control valve 24. The shock-absorbing strut 20 comprises a first shock-absorbing strut element 26 with a work chamber 28, a second shock-absorbing strut element 30 with a second work chamber 32, a damper 34 with a throttle point 36 and a spring element 38.

The pressure source 2 is connected with the pressure control device 4 by means of a first hydraulic line 41. The pressure control device 4 is connected with the work chamber 28 of the first shock-absorbing strut element 26 by means of a second hydraulic line 42. A third hydraulic line 43 leads from the reservoir 10 to the work chamber 28 of the first shock-absorbing strut element 26. The second work chamber 32 of the second shock-absorbing strut element 30 is connected with the pressure source 2 by means of a fourth hydraulic line 44. The fourth hydraulic line 44 terminates in the first hydraulic line 41. The third hydraulic line 43 terminates in the second hydraulic line 42. The flow control valve 6 is located in the course of the third hydraulic line 43 and the flow control valve 8 is located in the course of the second hydraulic line 42. The work chamber 28 of the first shock-absorbing strut element 26 and the second work chamber 32 of the second shock-absorbing strut element 30 are at least partially filled with a pressure medium. The reservoir 10 also contains the pressure medium and additionally a compressible medium. The flow control valve 6 and the flow control valve 8 are disposed in the hydraulic lines 42, 43 in such a way that the pressure medium being exchanged between the work chamber 28 and the reservoir 10 flows by way of the pressure control valves 6 and 8. The reservoir 22 is connected with the second work chamber 32 of the second shock-absorbing strut element 30 by means of the fourth hydraulic line 44. The flow control valve 24 is disposed in such a way that the pressure medium being exchanged between the second work chamber 32 and the reservoir 22 flows by way of the flow control valve 24. The two flow control valves 6 and 8 have the same function to a large extent, so that normally one of the flow control valves 6 and 8 is sufficient. The reservoir 22 and the flow control valve 24 are illustrated to complete the picture. The vehicle suspension in accordance with the invention can also operate without the reservoir 22 and the flow control valve 24.

The pressure source 2, the pressure control device 4, the flow control valves 6 and 8, the sensor 14 and the throttle point 36 are connected with the electrical control device 12 by means of electrical control lines 48, shown by dotted lines in the drawing.

The shock-absorbing strut 20 is motionally provided between a vehicle chassis and a wheel support. In this case the second mass 18 is a wheel support with a vehicle wheel or with a group of vehicle wheels and the first mass 16 is in this case a portion of the vehicle chassis.

A load force 50 generated by the first mass 16 acts on the shock-absorbing strut 20. The load force 50 is symbolically indicated by an arrow. The shock-absorbing strut 20 acts on the first mass 16 at the same rate as the load force 50, but in the opposite direction. In the system illustration selected by way of example for FIG. 1, the force of the shock-absorbing strut 20 acting on the first mass 16 is composed of a counter force 52, a first supplementary force 54, a second supplementary force 55 and a damping force of the damper 34. For reasons of simplicity the damper 34 and thus also the damping force of the damper 34 is disregarded in the following discussion. The counter force 52 is generated by the pressure medium which is under pressure in the work chamber 28. The first supplementary force 54 is generated by the pressure medium which is under pressure in the second work chamber 32. The second supplementary force 55 is generated by the spring element 38. The first supplementary force 54 and the second supplementary force 55 act in the same direction. The sum of the first supplementary force 54 and of the second supplementary force 55 can be considered to be a supplementary force 56.

The pressure source 2 can be variously realized, depending on the requirements. For example, the pressure source 2 comprises a tank for the pressure medium, a controllable pump or a fixed displacement pump and one or a plurality of pressure control valves. The first hydraulic line 41 comprises, for example, a supply line 58 and a first return line 59. The pump of the pressure source 2 moves the pressure medium from the tank into the supply line 58 of the first hydraulic line 41. The pressure in the supply line 58 can be kept at a constant value with the aid of one of the pressure control valves of the pressure source 2. The pressure medium can flow back into the tank of the pressure source 2 via the return line 59 of the first hydraulic line 4. If necessary, it is possible to keep the pressure of the pressure medium in the return line 59 at a constant value by means of a further pressure control valve. The fourth hydraulic line 44 either leads into the supply line 58 of the first hydraulic line 41 or into the return line 59 of the first hydraulic line 41, depending on which is more practical.

Depending on the particular use, it may be advantageous for reasons of energy savings if the pump of the pressure source 2 moves the pressure medium out of the return line 59 into the supply line 58 at a pressure level already increased in respect to the tank pressure. Therefore this is a two-stage pressure supply in which the second stage conveys the pressure medium within a closed circuit and the first stage generates the pressure level in the return line 59.

The vehicle suspension known up to now has no chamber functionally corresponding to the work chamber 32 and no spring corresponding to the spring element 38. In the vehicle suspension known up to now, the rate of the counter force 52 is therefore equal to that of the load force 50. The load force 50 can vary considerably. In the known vehicle suspension, the counter force 52 also varies in the same amount. The load force 50 or the counter force 52 varies as a function of a load condition of the vehicle chassis, as well as a function of the longitudinal and lateral acceleration of the vehicle. In case of lateral acceleration caused by cornering, a load force 50 on the outside of the turn is considerably greater than a load force 50 on the inside of the turn. In case of longitudinal acceleration caused by increasing speed of the vehicle, a rear load force 50 is considerably greater than a front load force 50. In case of deceleration caused by braking this is reversed.

The shock-absorbing strut 20 is used, among other things, for cushioning the first mass 16. The first mass 16 corresponds to a portion of the vehicle chassis. The spring stiffness of the vehicle suspension is essentially determined by the pressure of the pressure medium in the work chamber 28 and by the size of a ga volume in the reservoir 10 by the pressure in the reservoir 10 and by the diameter of a piston in the shock-absorbing strut 20. Because the reservoir 10 is connected with the work chamber 28, the same pressure is obtained in the reservoir 10 as in the work chamber 28, except for the effects caused by the flow control valves 6 and 8.

Under maximum load force 50, maximum pressure is obtained in the work chamber 28 and the vehicle suspension operates with maximum spring stiffness. Under minimum load force 50, minimum pressure is obtained in the work chamber 2 and the vehicle suspension operates with minimum spring stiffness. The quotient of maximum spring stiffness and minimum spring stiffness is a function of the quotient of maximum pressure and minimum pressure. The pressure in the work chamber 28 determines the counter force 52. Thus, it is also true that: the quotient of maximally occurring spring stiffness (C max) and minimally occurring spring stiffness (C min) is a function of maximally occurring counter force 52 (F max) and minimally occurring counter force 52 (F min). In a formula this reads: C max/C min=f(F max/F min).

FIGS. 4a, 4b, 5a and 5b are diagrams of the occurring forces. FIG. 4a indicates by means of a downwardly pointing arrow the minimally occurring load force 50, and an arrow of equal length indicates the counter force in connection with an already known vehicle suspension. FIG. 4b indicates by means of a downwardly pointing arrow the maximally occurring load force 50, and an arrow of equal length indicates the counter force in connection with the same, already known vehicle suspension. FIG. 5a symbolically shows by means of arrows the load force 50, the counter force 52 and the supplementary force 56 by way of example in connection with the minimally occurring load force 50 in the vehicle suspension of the invention. FIG. 5b shows the same forces according to FIG. 5a, but in 5b in connection with the maximally occurring load force 50 in the vehicle suspension of the invention.

In all drawing figures, the same parts or those operating in the same way have been provided with the same reference numerals.

FIGS. 4a, 4b, 5a and 5b each show a zero line 66 indicated by dashed lines, a line 67 extending parallel to the zero line and a second, solid line 68. On the side of the line 67 facing away from the zero line 66, the line 68 also extends parallel to the zero line 66. In each one of FIGS. 4a and 5a a short arrow with the reference numeral 50 extends from the line 67 to the zero line 66. This arrow symbolizes the minimal load force. In FIGS. 4b and 5b a longer arrow, also with the reference numeral 50, extends from the line 68 to the zero line 66. This arrow symbolizes the maximal load force. Starting at the zero line 66, a short arrow extends to the line 67 in FIG. 4a. This arrow symbolizes the counter force occurring in the known vehicle suspension with minimum load force 50. Also starting at the zero line 66 in FIG. 4b, a longer arrow extends as far as the line 68. This arrow symbolizes the counter force occurring in the known vehicle suspension with maximum load force 50.

The supplementary force 56 acting in the same direction as the load force 50 is provided in the vehicle suspension in accordance with the invention. The supplementary force 56 is independent from the load force 50. This supplementary force 56 acts opposite the counter force 52 and thus, in FIGS. 5a and 5b, starting at the zero line 66 and away from the lines 67 and 68 in the direction of a line 69. To obtain an equilibrium of forces, the counter force 52 must be greater than the load force 50 by the amount of the supplementary force 56. In FIG. 5a an arrow, extending from the line 69 to the line 67 symbolizes the counter force 52 at minimal load force 50 and in FIG. 5b a larger arrow, extending from the line 69 to the line 68 symbolizes the counter force 52 at a maximal load force 50. A comparison of FIGS. 5a, b with FIGS. 4a, b shows that in the vehicle suspension in accordance with the invention (FIGS. 5a, b) the quotient of the counter force 52 at maximum load force 50 and counter force 52 at minimum load force 50 is clearly less than in the vehicle suspensions known up to now (FIGS. 4a, b).

Figure 2:
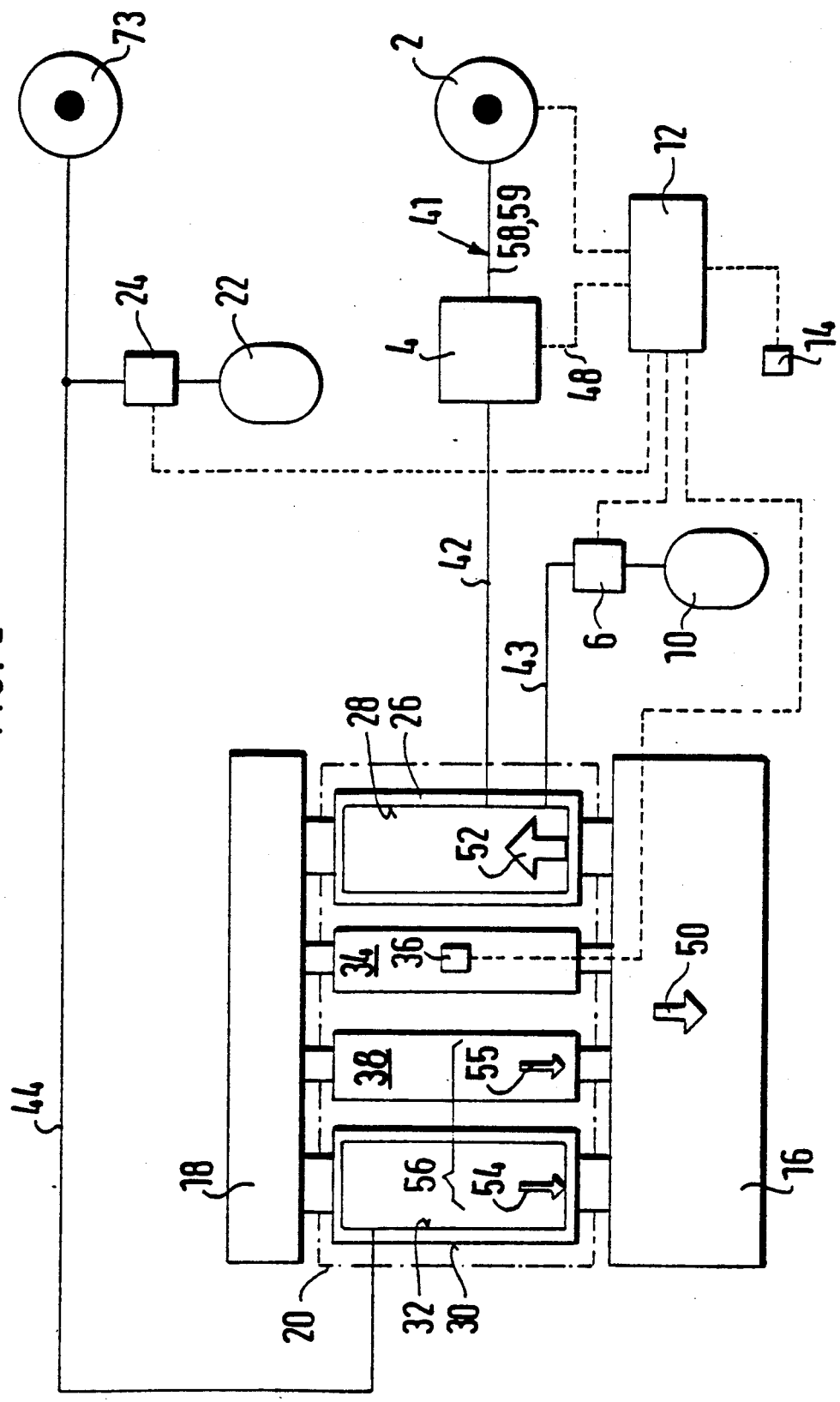

FIG. 2 shows the vehicle suspension also in symbolic, but somewhat varied form. Depending on the hinging of the wheel support on the vehicle chassis, the first mass 16 either acts in a pulling (FIG. 1) or a pushing (FIG. 2) way on the shock-absorbing strut 20. In FIG. 1 the load force 50 attempts to reduce a distance between the two masses 16, 18, and in FIG. 2 the load force 50 attempts the increase the distance between the two masses 16 and 18. This yields the respective direction of the counter force 52 and the respective direction of the supplementary force 56. This means that there are vehicle suspensions in which the occurring forces are deflected in such a way that a lowering of the vehicle chassis means an elongation of the suspension. So as not to be required to illustrate the known deflections of such a vehicle suspension, the first mass 16 (chassis) is disposed below the second mass 18 (wheel support with vehicle wheel) in FIG. 2. It is no problem for one skilled in the art to add in his mind a known deflection to FIG. 2, so that the vehicle chassis is located in the conventional manner above the wheel support and the vehicle wheel.

Instead of connecting the second work chamber 32 with the pressure source 2 (FIG. 1), it is also possible, for example, to supply the second work chamber 32 with more or less constant pressure by means of a separate pressure source 73 (FIG. 2). Instead of connecting the second work chamber 32 to the pressure source 2 or 73, it is also possible to maintain the pressure in the second work chamber 32 at a more or less constant value with the aid of the reservoir 22 only. In FIG. 2 the third hydraulic line 43 leads from the reservoir 10 via the flow control valve 6 directly to the work chamber 28. Therefore valve 8 is not needed.

With the aid of the flow control valves 6 and 8 it is possible, for example, to throttle the pressure medium being exchanged between the work chamber 28 and the reservoir 10. In this way it is possible to use the shock-absorbing strut element 26 with the work chamber 28 also as a damper for damping oscillations of the two masses 16, 18 in respect to each other. Depending on the constructive effort expended, the flow control valves 6, 8, and 24 can be made adjustable. In this case the damping of the shock-absorbing strut 20 can be influenced via the control device 12. Because the shock-absorbing strut element 26 and, if desired, the shock-absorbing strut element 30 may also have the effect of a damper, it is possible to omit the separate damper 34, if desired.

Figure 3:
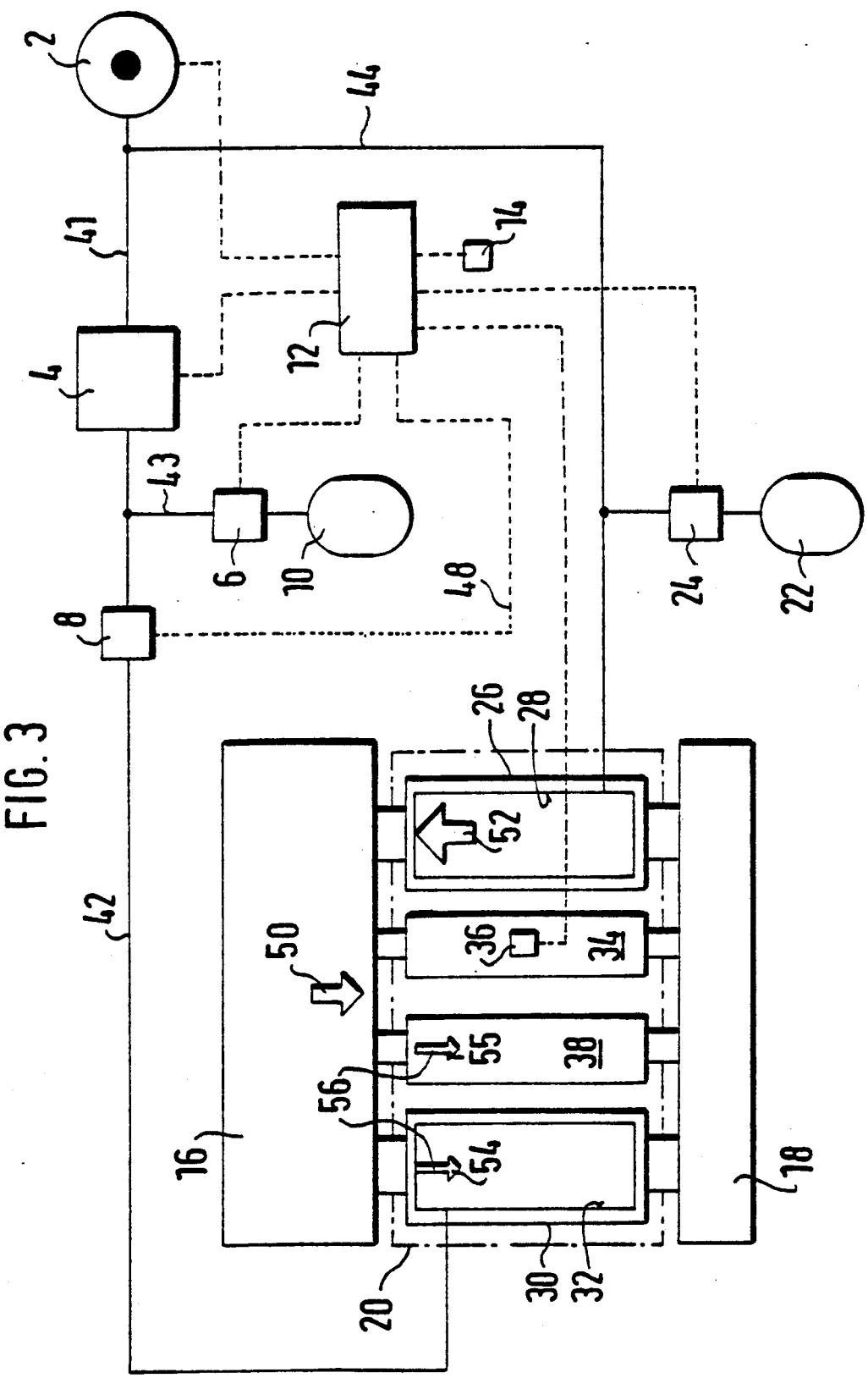

By way of example, FIG. 3 shows a further variant of the vehicle suspension in accordance with the invention. As explained by means of FIGS. 5a and 5b, the sum of the load force 50 and the supplementary force 56 must have the same value as the counter force 52. The counter force 52 in the variants described by means of FIGS. 1 and 2 is changed to achieve an equilibrium of force when the load force 50 changes by adapting the pressure in the work chamber 28 with the aid of the pressure control device 4 to correspond to the load force 50. Another possibility for achieving force equilibrium comprises maintaining the counter force 52 constant while the load force 50 changes and instead to change the supplemental force 56 as a function of the load force 50. For the purpose of adaptation to the load force 50, the supplemental force 56 in the variant shown in FIG. 3 is set above the pressure in the second work chamber 32 with the aid of the pressure control device 4.

In FIG. 3, the pressure control device 4 is connected with the second work chamber 3 via the second hydraulic line 42. The first hydraulic line 41 is connected with the work chamber 28 via the fourth hydraulic line 44. Pressure in the second work chamber 32 generates the supplemental force 56 which, in relation to the shock-absorbing strut 20, acts in the same direction as the load force 50. Pressure in the work chamber 28 generates the counter force 52 which is kept at a constant value in the variant shown in FIG. 3. For this reason it is necessary to decrease the counter force 56 via the pressure control device 4 when the load force 50 increases, in order to achieve a force equilibrium. Correspondingly, with decreasing load force 50 the supplemental force 56 must be increased.

Figure 6:
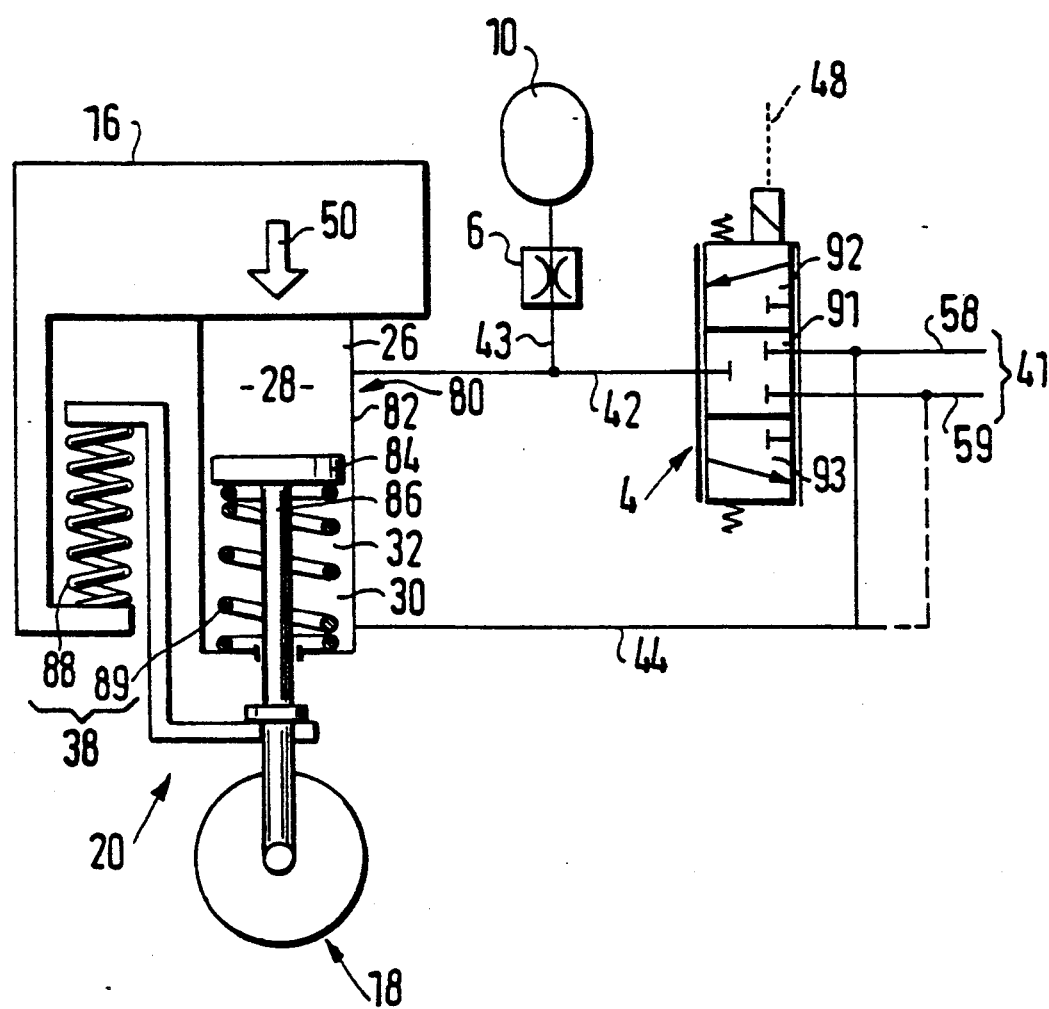

FIG. 6 shows a first preferred exemplary embodiment of the vehicle suspension shown symbolically in FIGS. 1 to 3. In the first exemplary embodiment in accordance with FIG. 6, the first shock-absorbing strut element 26 with the work chamber 28, the second shock-absorbing strut element with the second work chamber 32 and a portion of the spring element 38 are combined in an advantageous manner in a common cylinder 80. The cylinder 80 comprises a cylinder tube 82, a piston 84 and a piston rod 86. The piston 84, connected with the piston rod 86, divides an inner chamber of the cylinder 80 into two chambers, one of these chambers forming the work chamber 28 and the other chamber the second work chamber 32. In the exemplary embodiment illustrated, the work chamber 28 is located above the piston 84 and the second work chamber 32 below it. A first spring 88 is located outside of the cylinder 80 between the first mass 16 and the second mass 18. Inside the cylinder 80 a second spring 89 acts with one end on the piston 84 and with the other on the cylinder tube 82. The first spring 88 and the second spring 89 together form the spring element 38. The force resulting from the springs 88, 89 acts in this exemplary embodiment, as does the load force 50, in the sense of a shortening of the distance between the first mass 16 and the second mass 18. Depending on the requirements, it is particularly practical to use either the spring 88 alone or the spring 89 alone for the spring element 38.

In FIG. 6, the pressure control element 4 is, by way of example, an electromagnetically operable proportional valve with essentially three switching positions and three connections. In a first switching position 91 all three connections are uncoupled. In a second switching position 92 there is a connection from the supply line 58 of the first hydraulic line 41 to the second hydraulic line 42, the return line 59 is uncoupled. In a third switching position 93 there is a connection from the second hydraulic line 42 to the return line 59 of the first hydraulic line 41; the supply line 58 is uncoupled in respect to the second hydraulic line 42. Depending on the operational state of the pressure control device 4, the pressure medium is throttled to a greater or lesser degree when flowing out of the supply line 58 into the second hydraulic line 42 or from the second hydraulic line 42 into the return line 59.

It is practical to provide as constant a pressure as possible in the supply line 58, which is at least slightly higher than the maximally required pressure in the work chamber 28. It is therefore particularly advantageous to connect, via the hydraulic line 44, the second work chamber 32 of the cylinder 80 with the supply line 58 of the first hydraulic line 41. Depending on the type of application, it is practical to provide as constant a pressure as possible in the return line 59, too, so that it may be particularly advantageous to connect the second work chamber 32 via the fourth hydraulic line 44 with the return line 59 of the first hydraulic line 41. The pressure in the return line 59 need not be zero, but may be at a raised level.

In the vehicle suspension in accordance with the invention, the pressure in the second work chamber acts in the same sense as the spring element 38 on the distance between the first mass 16 and the second mass 18, so that the supplemental force 56 (FIGS. 1 to 5) can also be arbitrarily generated either by the spring element 38 alone or only by means of the pressure in the work chamber 32. If the supplemental force 56 is solely generated by means of the spring element 38, the chamber located below the piston 84 of the cylinder 80 may be open towards the outside and the fourth hydraulic line 44 can be omitted. Accordingly, the seal between the cylinder tube 82 and the piston rod 86 can also be omitted, which is particularly advantageous especially in view of friction.

In the first exemplary embodiment in accordance with FIG. 6, the cylinder tube 82 of the cylinder 80 is a component of the first mass 16 and the piston cylinder 86 with the piston 84 are components of the second mass 18. In a second exemplary embodiment in accordance with FIG. 7 this is reversed. There, the cylinder tube 82 of the cylinder 80 is a component of the second mass 18 and the piston cylinder 86 with the piston 84 is a component of the first mass 16.

Figure 7:
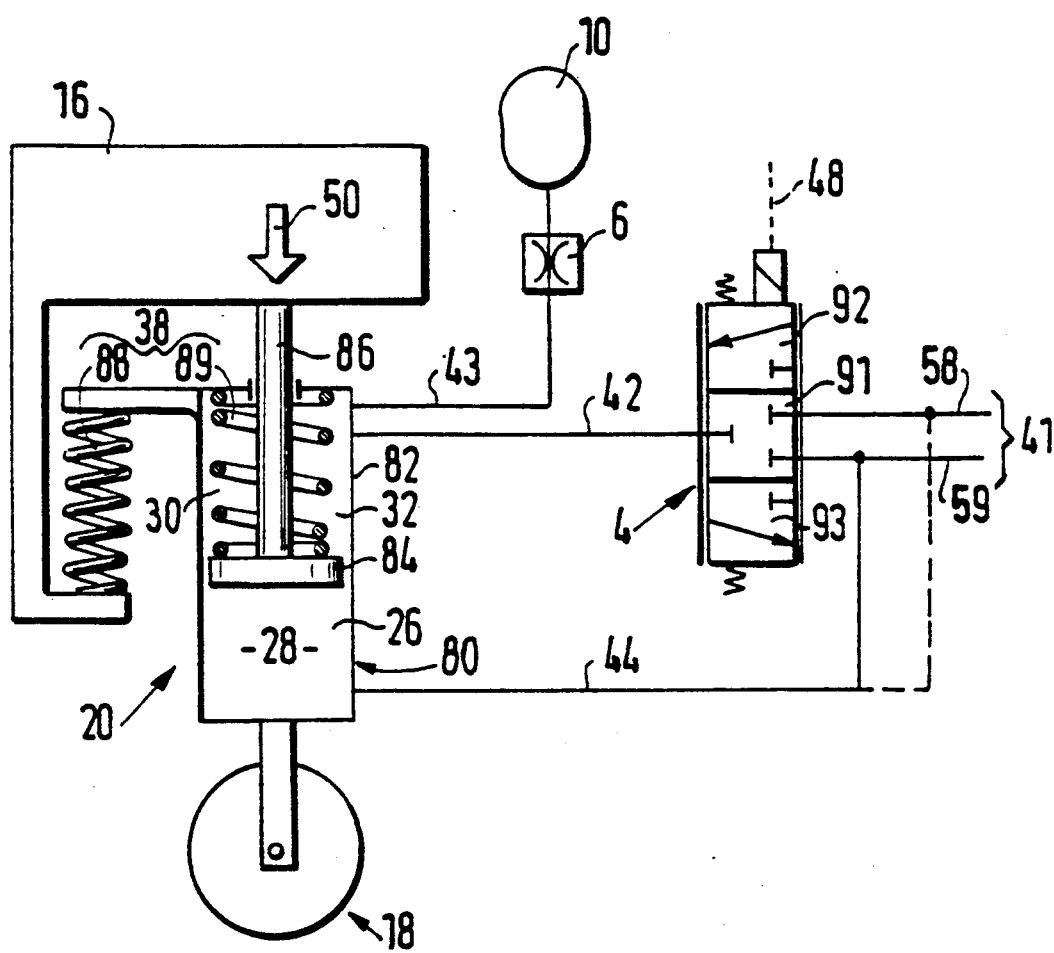

FIG. 7 illustrates the second exemplary embodiment. An exemplary embodiment of the variant of the vehicle suspension in accordance with the invention shown symbolically in FIG. 3 is illustrated in FIG. 7. Here, the pressure control device 4 is connected via the second hydraulic line 42 with the second work chamber 32. The work chamber 28 is connected via the fourth hydraulic line 44 either with the return line 59, in which there is preferably as constant a pressure as possible, or with the supply line 58, where there is preferably as constant a pressure as possible in the supply line 58. In the second exemplary embodiment in accordance with FIG. 7, the counter force 52 generated by means of the pressure in the work chamber 28 remains to a large degree constant. The distance between the two masses 16 and 18 is affected by means of the change of the supplemental force 56. The supplemental force 56 is formed by the spring element 38 and the pressure of the pressure medium in the second work chamber 32. The pressure in the work chamber 32 can be affected by means of the pressure control device 4. In this way the distance between the two masses 16 and 18 can be influenced as needed by means of the pressure control device 4.

In the second exemplary embodiment in accordance with FIG. 7, the reservoir 10 is connected via the flow control valve 6 with the aid of the third hydraulic line 43 with the second work chamber 32.

Figure 8:
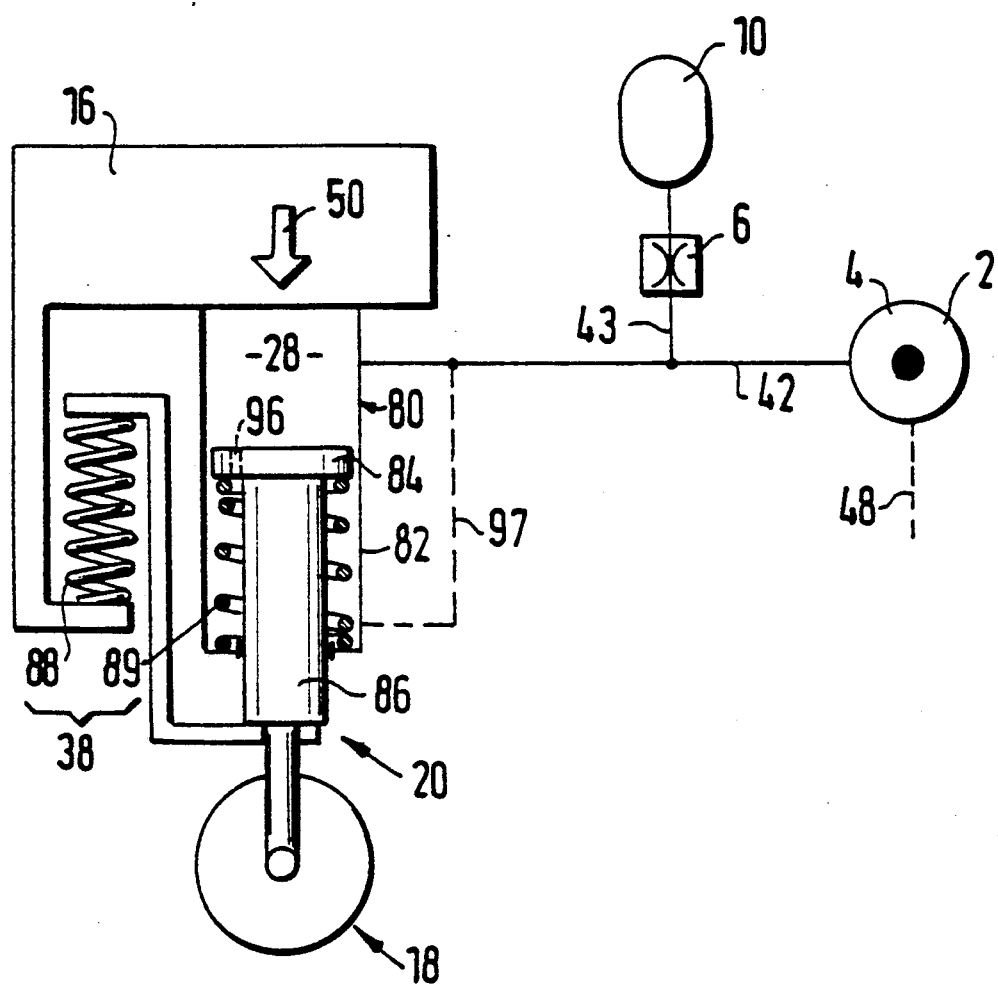

FIG. 8 shows a third exemplary embodiment. In the third exemplary embodiment the work chamber 28 extends on both sides of the piston 84. This is achieved by means of the connection 96 extending through the piston 84 and/or by means of a connection 97 extending outside of the cylinder 80. The connections 96, 97 should not be confused with one of the hydraulic lines 41, 42, 43, 44, because their purpose is completely different. In the exemplary embodiment in accordance with FIG. 8 the counter force 52 can be changed by altering the pressure in the work chamber 28. The effective area for the pressure in the work chamber 28 corresponds to the cross-sectional surface of the piston rod 86.

In the third exemplary embodiment in accordance with FIG. 8, for example, the pressure source 2 is not only used to supply a more or less constant pressure, but it is possible to control the pressure which is supplied to the work chamber 28 via the second hydraulic line 42 directly in the pressure source 2. This is accomplished, for example, in that the pressure source 2 comprises a pressure-controlled pump, or that the pressure source 2 contains, for example, a controllable pressure control device. In this way the pressure source 2 takes over at the same time the function of the pressure control device 4, for which reason the pressure source 2 has been additionally provided with the reference numeral 4 in FIG. 8.

Figure 9:
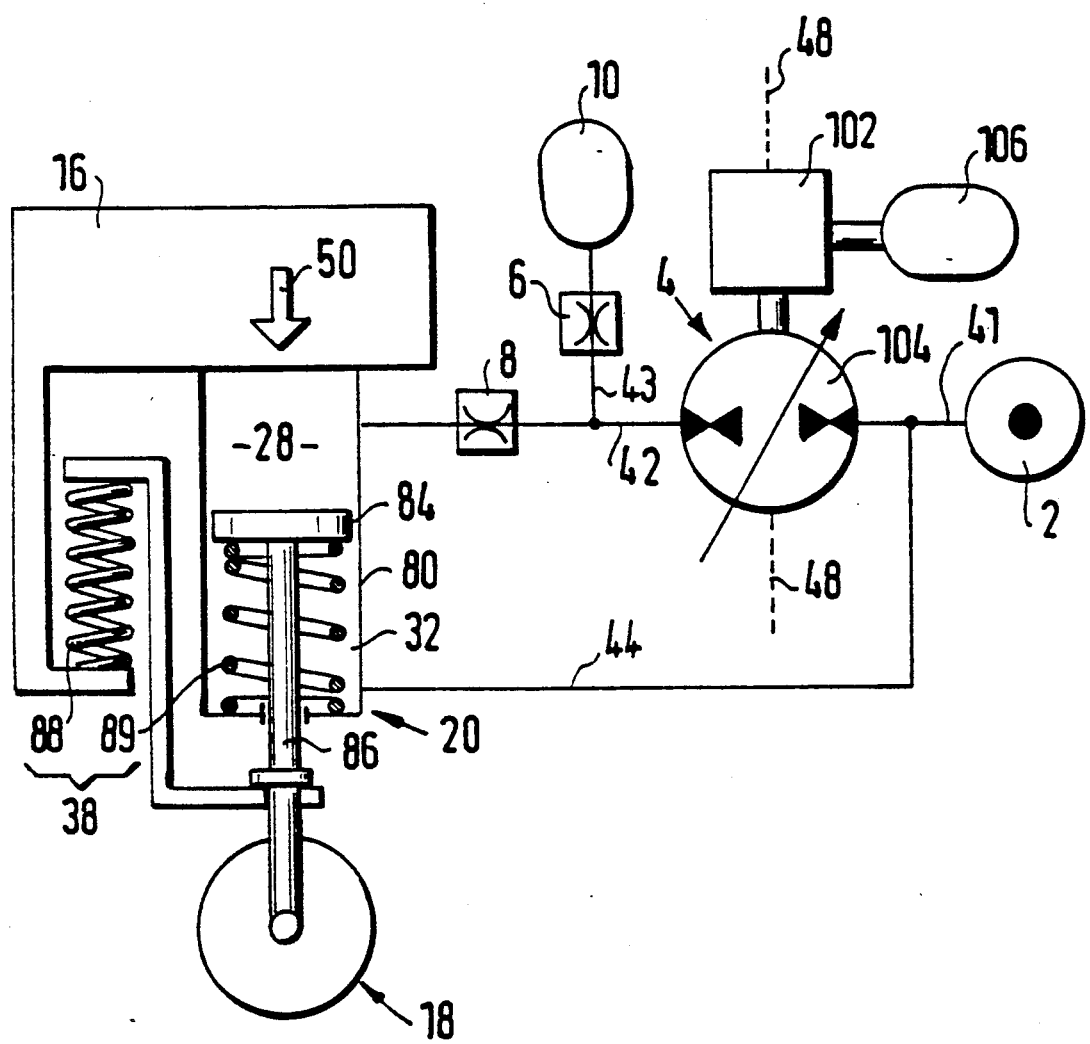

FIG. 9 shows a fourth exemplary embodiment. In this exemplary embodiment the pressure control device 4 comprises a motor 102 and a converter 104. The converter 104 can be driven by means of the motor 102. The motor 102 receives its power from an energy supply 106. In this exemplary embodiment it is particularly practical to make pressure available by means of the pressure source 2 in the first hydraulic line 41, which corresponds to a median load force 50. If the load force 50 increases and/o if it is intended to extend the shock-absorbing strut 20, the converter 104, driven by the motor 102, can increase the pressure in the second hydraulic line 42 and thus in the work chamber 28 in respect to the pressure made available by the pressure source 2. If the load force 50 decreases and/or if it is intended to retract the shock-absorbing strut 20, it is possible to move a portion of the pressure medium by means of the converter 104 from the second hydraulic line 42 into the first hydraulic line 41. The converter 104 of the pressure control device 4 is able to raise or lower the pressure in the second hydraulic line 42 in respect to the pressure in the first hydraulic line 41. Raising of the pressure or lowering of the pressure in the second hydraulic line 42 takes place, for example, by means of the converter 104 being driven by the motor 102 one time in one direction and one time in the other direction. Depending on the rpm and the direction of rotation of the motor 102, the pressure in the second hydraulic line 42 rises or lowers more or less. In this case the converter 104 is, for example, a feed pump with a feed volume which is constant per revolution and which can feed in either direction. However, it is also possible to design the pressure control device 4 in such a way that the motor 102 drives the converter 104 at constant rpm. In this case it is particularly advantageous to embody the converter 104 in the form of a rotary pump in which the volume displaced by the rotary pump per revolution is adjustable. In this case it is practical to design the converter 104 in such a way that it feeds one time in the direction of the second hydraulic line 42 and one time in the direction of the first hydraulic line 41, while the motor 102 turns in the same direction.

The vehicle suspension in accordance with the invention can be designed in such a way that effectively there is very little energy required for its operation. The operation of the vehicle suspension in accordance with the invention requires particularly little energy if the vehicle suspension is designed in such a way, that energy is only expended while the load force 50 increases or while the shock-absorbing strut 20 is extended and that, while the load force 50 is decreased or during a retraction operation of the shock-absorbing strut 20 this previously expended energy is returned to the energy supply 106. This can be realized in a particularly simple manner, if the vehicle suspension in accordance with the invention is equipped with a pressure control device 4 as shown in FIG. 9 and described by means of the fourth exemplary embodiment. If the pressure in the second hydraulic line 42 is to be raised, the energy supply 106 provides energy for the motor 102. The motor 102 drives the converter 104 with the help of this energy. In this case, the converter 104 acts as a pump and feeds pressure medium from the first hydraulic line 41 into the second hydraulic line 42, because of which the pressure in the hydraulic line 42 is increased in respect to the pressure in the hydraulic line 41. Thus energy flows from the energy supply 106 via the motor 102 and the converter 10 into the shock-absorbing strut 20. In the reverse case, when it is intended to lower the pressure in the hydraulic line 42 again back down to the pressure in the hydraulic line 41, the converter 104 acts in the sense of a hydraulic motor which, driven by the pressure difference between the second hydraulic line 42 and the first hydraulic line 41, drives the motor 102, because of which the motor 102 acts in the sense of a generator and transfers the energy coming from the converter 104 to the energy supply 106. The energy can be temporarily stored there until it is again supplied to the shock-absorbing strut 20 when needed. This type of vehicle suspension in accordance with the invention requires little energy namely only a little control energy which is supplied via the control lines 48 to the devices to be controlled, and furthermore only a little amount of energy is required to even out the frictional losses and current losses which can never be completely prevented.

In the exemplary embodiments and variants of the vehicle suspension shown in the drawings, the reservoir 10 is disposed outside of the shock-absorbing strut 20. However, the reservoir 10 may just as easily be disposed inside of the shock-absorbing strut 20. In particular, the reservoir 10 can be provided directly above the cylinder 80 illustrated in FIGS. 6 to 9. The reservoir 80 can be located inside the cylinder 80 and for example may be separated by only a partition from the work chamber 28 or the second work chamber 32.

In a smaller vehicle, for instance a passenger car, normally four shock-absorbing struts 20 per vehicle are provided. There may be more in larger vehicles. In connection with the vehicle suspension in accordance with the invention it is possible to supply all shock-absorbing struts 20 or all groups of shock-absorbing struts 20 with a pressure medium by means of a single pressure source 2 to control them from one control device 12. In the vehicle suspension in accordance with the invention having the supplemental force 52, it is possible to realize any desired ratio of maximally occurring spring stiffness to minimally occurring spring stiffness with the aid of this supplemental force 56. Particularly in the course of extreme cornering, the stiffness of the shock-absorbing strut 20 of the wheel at the outside of the turn would be considerably higher without the supplemental force 56 than the stiffness of a shock-absorbing strut 20 of a wheel on the inside of the turn. It can be provided by an appropriate selection of the size of the supplemental force 56 that the difference between the stiffness of the shock-absorbing strut 20 at the outside of the turn and the stiffness of the shock-absorbing strut 20 at the inside of the turn does not exceed a desired value.

The foregoing relates to preferred exemplary embodiments of the invention it being understood that other variants and embodiments thereof are possible within the spirit and scope of the invention, the latter being defined by the appended claims.

What is claimed and desired to be secured by letters patent of the United States is:

1. A vehicle suspension with a shock-absorbing strut means motionally provided between a first and a second mass for affecting a distance of the first mass in respect to the second mass, where a load force (50) attempts to change the distance between the two masses, comprising a first work chamber (28) and a second work chamber (32) formed by the shock-absorbing strut means with said first and second work chambers filled at least partially with a pressure medium from a first pressure source (2), where a pressure in the first work chamber creates a counter force (52) directed opposite to the load force, also having a pressure control device (4) in a pressure line to said first work chamber, where a pressure medium controlled by this pressure control device is suitable for affecting the distance between the two masses, and having a pressure reservoir (10) connected between the pressure control device and the shock-absorbing strut means for affecting the spring stiffness of the shock-absorbing strut means, said shock-absorbing strut means is provided with a supplemental force means which produces a supplemental force (54, 55), which attempts to change the distance between the two masses (16, 18) in the same direction as the load force (50), said supplemental force means includes at least one spring element (38, 88,89) separate from said second work chamber which forms at least a portion of the supplemental force means whereby in order to maintain a balance of forces the counterforce (52) which lifts the chassis must be correspondingly greater than the supplemental force.

2. A vehicle suspension in accordance with claim 1, in which at least one flow control valve (6, 8) is provided in a hydraulic line (43) between the first work chamber (28) and the reservoir (10).

3. A vehicle suspension in accordance with claim 1, in which the second work chamber (32) is connected with a second pressure source (73).

4. A vehicle suspension in accordance with claim 1, in which the shock-absorbing strut means (20) comprises a cylinder (80), a piston rod (86) and a piston (84) connected with the piston rod (86) and dividing an inner chamber of the cylinder (80) into said first and second chambers, the first chamber forms the first work chamber (28) and the second chamber forms the second work chamber (32).

5. A vehicle suspension in accordance with claim 2, in which the shock-absorbing strut means (20) comprises a cylinder (80), a piston rod (86) and a piston (84) connected with the piston rod (86) and dividing an inner chamber of the cylinder (80) into said first and second chambers, where the first chamber forms the work chamber (28) and the second chamber forms the second work chamber (32).

6. A vehicle suspension in accordance with claim 1, in which the shock-absorbing strut means (20) comprises a cylinder (80), a piston rod (86) and a piston (84) connected with the piston rod (86) and dividing an inner chamber of the cylinder (80) into said first and second chambers, where the first chamber forms the work chamber (28) and a spring element is provided in the second chamber.

7. A vehicle suspension in accordance with claim 2, in which the shock-absorbing strut means (20) comprises a cylinder (80), a piston rod (86) and a piston (84) connected with the piston rod (86) and dividing an inner chamber of the cylinder (80) into said first and second chambers, where the first chamber forms the work chamber (28) and a spring element is provided in the second chamber.

8. A vehicle suspension in accordance with claim 3, in which the shock-absorbing strut means (20) comprises a cylinder (80), a piston rod (86) and a piston (84) connected with the piston rod (86) and dividing an inner chamber of the cylinder (80) into said first and second chambers, where the first chamber forms the work chamber (28) and a spring element is provided in the second chamber.

9. A vehicle suspension in accordance with claim 1, in which a pressure provided by said pressure source (2) for the shock-absorbing strut means (20) can be reduced to a lower value with the aid of the pressure control device (4).

10. A vehicle suspension in accordance with claim 1, in which a pressure provided by said pressure source (2) for the shock-absorbing strut means (20) can be raised to a higher value with the aid of the pressure control device (4).

11. A vehicle suspension with a shock-absorbing strut means motionally provided between a first and a second mass for affecting a distance of the first mass in respect to the second mass, where a load force (50) attempts to change the distance between the two masses, comprising a first work chamber (28) and a second work chamber (32) formed by the shock-absorbing strut means, said first work chamber (28) and said second work chamber (32) are filled at least partially with a pressure medium from a first pressure source (2), where a pressure in the first work chamber creates a counterforce (52) directed opposite to the load force, also having a pressure control device (4) in a pressure line to said first work chamber, where a pressure medium controlled by said pressure control device is suitable for affecting the distance between the two masses, and having a pressure reservoir (10) connected between the pressure control device and the shock-absorbing strut means for affecting the spring stiffness of the shock-absorbing strut means, said shock-absorbing strut means is provided with a supplemental force means which produces a supplemental force (54, 55), which attempts to change the distance between the two masses (16, 18) in the same direction as the load force (50), said supplemental force means includes at least one spring element (38, 88, 89) separate from said second work chamber (32) which forms at least a portion of the supplemental force means, and the pressure of the pressure medium in the second work chamber (32) forms at least a portion of the supplemental force means whereby in order to maintain a balance of forces the counterforce (52) which lifts the chassis must be correspondingly greater than the supplemental force.

12. A vehicle suspension in accordance with claim 11, in which at least one flow control valve (6, 8) is provided in a hydraulic line (43) between the first work chamber (28) and the reservoir (10).

13. A vehicle suspension in accordance with claim 11, in which the second work chamber (32) is connected with a second reservoir (22).

14. A vehicle suspension in accordance with claim 11, in which the shock-absorbing strut means (20) comprises a cylinder (80), a piston rod (86) and a piston (84) connected with the piston rod (86) and dividing an inner chamber of the cylinder (80) into said first and second chambers, where the first chamber forms the work chamber (28) and the second chamber forms the second work chamber (32).

15. A vehicle suspension in accordance with claim 12, in which the shock-absorbing strut means (20) comprises a cylinder (80), a piston rod (86) and a piston (84) connected with the piston rod (86) and dividing an inner chamber of the cylinder (80) into said first and second chambers, where the first chamber forms the work chamber (28) and a spring element is provided in the second chamber.

* * * * *